US006898468B2

(12) United States Patent
Ott et al.

(10) Patent No.: US 6,898,468 B2
(45) Date of Patent: May 24, 2005

(54) FUNCTION BLOCK IMPLEMENTATION OF A CAUSE AND EFFECT MATRIX FOR USE IN A PROCESS SAFETY SYSTEM

(75) Inventors: Michael Ott, Austin, TX (US); Gary Law, Georgetown, TX (US); Dennis Stevenson, Round Rock, TX (US); Robert Havekost, Austin, TX (US); Julian Naidoo, Cedar Park, TX (US); Godfrey R. Sherriff, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 136 days.

(21) Appl. No.: 10/401,655

(22) Filed: Mar. 28, 2003

(65) Prior Publication Data

US 2004/0193290 A1 Sep. 30, 2004

(51) Int. Cl.[7] .............................................. G05B 11/01
(52) U.S. Cl. .............................. 700/21; 700/79; 714/1; 714/37
(58) Field of Search ........................ 700/21, 79; 714/1, 714/37

(56) References Cited

U.S. PATENT DOCUMENTS

| | | | |
|---|---|---|---|
| 5,768,119 | A | 6/1998 | Havekost et al. |
| 6,049,578 | A | 4/2000 | Senechal et al. |
| 6,078,320 | A | 6/2000 | Dove et al. |
| 6,292,523 | B1 | 9/2001 | Senechal et al. |
| 6,369,836 | B1 | 4/2002 | Larson et al. |
| 2002/0198907 | A1 * | 12/2002 | Klapper et al. ............. 707/503 |

FOREIGN PATENT DOCUMENTS

WO     WO-00/38040     6/2000

OTHER PUBLICATIONS

Great Britain Search Report under Section 17(5) issued in GB0406816.9 application by United Kingdom Patent Office on Jul. 29, 2004.
"CEM Programming Language Editor," Triconex, located on the web at http://www.triconex.com/library/Tricon%20-Technical%20Specifications%20-%20CEM%20Programming%20Language%20Editor.pdf, 2 pages.
"Simplified Safety System Programming," Control Engineering.online, Sep. 1, 2000, 2 pages, available at http://www.manufacturing.net/ctl/index.asp?layout=article&articleid=CA211671, printed on Jun. 3, 2003.

(Continued)

*Primary Examiner*—Anthony Knight
*Assistant Examiner*—Ron D Hartman, Jr.
(74) *Attorney, Agent, or Firm*—Marshall, Gerstein & Borun LLP

(57) ABSTRACT

A cause and effect function block, which can be easily integrated into a function block diagram programming environment in a process plant safety system to implement the cause and effect logic specified by a traditional cause and effect matrix, includes a set of cause inputs and a set of effect outputs. A multiplexer within the cause and effect function block receives each of the cause inputs and is coupled to one or more state machines, with a separate state machine existing for each effect output. The multiplexer decodes each of the cause inputs and, based on the cause inputs and previously identified cause and effect matrix logic, provides a trip signal to one or more of the state machines. Upon receiving a trip signal, a state machine forces an associated effect output into a tripped or safe state. If desired, the state machine may then use one or more other signals, such as signals from a user or from the process, to transition between a set of different states used to safely return the process plant back to the normal operating state from the tripped or safe state.

47 Claims, 4 Drawing Sheets

OTHER PUBLICATIONS

"IEC 61131-3: a standard programming resource," 8 pages, available at http://www.plcopen.org/intro_iec/intro_iec.htm, printed on May 15, 2003.

"QUADLOG Safety Matrix," Moore Process Automation Solutions, located on the web at http://www.sea.siemens.com/process/docs/piql-16.pdf, 6 pages, Dec. 1998.

"A structured approach to the specification and implementation of Cause & Effect application logic in safety related PLCs," TUV Rheinland, 4th International Symposium, PLCs in Safety Related Applications, Cologne, May 3rd to 4th, 2000, 18 pages.

"Safety Life Cycle Management with Cause and Effect Matrix Tools," William M. Goble and John A. Cusimano, Dec. 31, 1969, Summary found on the web at http://search-pdf.adobe.com/proxies/1/63/15/8.html, 2 pages.

* cited by examiner

FUNCTION BLOCK IMPLEMENTATION OF A CAUSE AND EFFECT MATRIX FOR USE IN A PROCESS SAFETY SYSTEM

FIELD OF TECHNOLOGY

The present invention relates generally to safety systems used in process plants and, more particularly, to a function block implementation of a cause and effect matrix used to control the operation of a safety system used within a process plant.

DESCRIPTION OF THE RELATED ART

Process control systems, like those used in chemical, petroleum or other processes, typically include one or more process controllers communicatively coupled to at least one host or operator workstation and to one or more field devices via analog, digital or combined analog/digital buses or lines. The field devices, which may be, for example valves, valve positioners, switches and transmitters (e.g., temperature, pressure and flow rate sensors), perform functions within the process plant such as opening or closing valves and measuring process parameters. The process controllers receive signals indicative of process measurements made by the field devices and/or other information pertaining to the field devices, use this information to implement control routines and then generate control signals which are sent over the buses or lines to the field devices to control the operation of the process. Information from the field devices and the controllers is typically made available to one or more applications executed by the operator workstation to enable an operator to perform any desired function with respect to the process, such as configuring the process, viewing the current state of the process, modifying the operation of the process, etc.

Furthermore, in many processes, a separate safety system is provided to detect significant safety related problems within the process plant and to automatically close valves, remove power from devices, switch flows within the plant, etc. when a problem occurs which might result in or lead to a serious hazard in the plant, such as a spill of toxic chemicals, an explosion, etc. These safety systems typically have one or more separate controllers apart from the standard process control controllers, called logic solvers, which are connected to safety field devices via separate buses or communication lines installed within the process plant. The logic solvers use the safety field devices to detect process conditions associated with significant events, such as the position of certain safety switches or shutdown valves, overflows or underflows in the process, the operation of important power generation or control devices, the operation of fault detection devices, etc. to thereby detect "events" within the process plant. When an event (typically called a "cause") is detected, the safety controller takes some action (typically called an "effect") to limit the detrimental nature of the event, such as closing valves, turning devices off, removing power from sections of the plant, etc. Generally, these actions or effects include switching safety devices into a tripped or "safe" mode of operation which is designed to prevent a serious or hazardous condition within the process plant.

In the past, safety systems have been programmed using what is traditionally called a cause and effect matrix, which relates each of a set of causes (typically detected process conditions) to one or more effects to be performed (i.e., switching of safety devices into a safe mode). In particular, the cause and effect matrix specifies one or more effects which should occur when each of a set of causes is detected as being present within the process plant. The presence of any particular cause can result in one or more effects, e.g., the operation of one or more different safety devices within the safety system. To specify the operation of a safety system, a safety engineer usually creates a cause and effect matrix, in which all of the causes are listed on one side of a two-dimensional matrix (e.g., corresponding to the rows of the matrix) and all of the effects are listed on another side of the matrix (e.g., correspond to the columns of the matrix). The elements of the matrix, as defined by a row and a column, are used to specify whether the cause associated with that matrix element should result in the operation of the effect associated with that matrix element. Generally, the configuration or safety engineer checks the element of the matrix to indicate that the detection of the cause for that element (specified by the row of the matrix element) is to result in the operation of the effect for that element (specified by the column of the matrix element). Thus, for example, a check in the matrix at the intersection of the second row and the third column means the that the presence of the cause associated with the second row should result in the operation of the effect associated with the third column of the matrix. In this manner, each effect can be specified to occur as a result of one or more of the causes.

Once the configuration or safety engineer has determined an appropriate cause and effect matrix for the safety system, or some portion thereof, the control routines of the safety system must be created to implement the logic defined by the cause and effect matrix. While, in the past, configuration or safety engineers have manually translated the cause and effect matrix into the safety system controllers using different programming languages, this programming step unfortunately has been tedious, time consuming and fraught with errors, which can be serious because a failure of the safety system to operate properly can lead to serious injury or even death on the part of plant personnel and to the destruction of potentially millions of dollars of equipment and material within a plant.

More recently, programs have been developed to automatically translate a cause and effect matrix into a high level control program, such as one that uses ladder logic. While helpful, this automatic program generation still results in a program, written in a particular programming language, that must be integrated into the safety system control strategy and that must be tested and debugged. Because safety logic translated in such a manner can result in highly complex programs, these programs can still be difficult and time consuming to test and debug and can require a lot of documentation. Moreover, it is difficult to use these types of programs in a control routine that uses a function block programming strategy to implement control functions.

SUMMARY OF THE DISCLOSURE

A safety system within a process plant uses one or more cause and effect function blocks that can be easily integrated into a function block diagram programming environment to implement the cause and effect logic specified by a traditional cause and effect matrix. Such a cause and effect function block, which is easy to create, use, test, debug and document, includes one or more cause inputs and one or more effect outputs and is programmed so that the arrival of a cause signal at one of the cause inputs results in one or more of the effect outputs being set to a tripped or safe state. The cause inputs may be connected to other function blocks, such as to voter function blocks, which determine the existence of the causes while the effect outputs may be connected to other function blocks such an analog or digital output function blocks which control the operation of safety equipment or other devices within the process plant.

The cause and effect function block may include a cause and effect matrix logic or multiplexer coupled to one or more state machines, with a separate state machine existing for each effect output. The multiplexer receives and decodes each of the cause inputs and, based on the cause inputs and a previously identified cause and effect matrix logic, provides a trip signal to one or more of the state machines. Upon receiving a trip signal, a state machine forces an associated effect output into a tripped or safe state. If desired, the state machine may then require one or more other signals, such as reset signals from a user or from the process, to transition between a set of states associated with safely returning the safety system from the tripped or safe state to a normal state (in which the process operates normally). Moreover, each state machine can provide a signal indicating the current state of the state machine as well as a signal indicating the first cause which resulted in the state machine forcing its associated effect signal to the tripped or safe state.

This cause and effect function block is easy to create, as, in its basic form, it only requires the configuration or safety engineer to supply a cause and effect matrix logic thereto and to specify values for a set of parameters to define the desired operation of the cause and effect function block. This cause and effect function block is also easy to integrate into a controller or logic solver which uses function block logic as the cause and effect function block can be integrated in the same manner as any other function block, by interconnecting inputs and outputs of the cause and effect function block to other function blocks or elements within the control strategy. As a result, this cause and effect function block is also easy to document, test and debug. Moreover, this cause and effect function block may provide additional functionality not normally provided in safety systems, such as enabling the safety system to cycle through a series of states before returning a particular safety device from a tripped or safe state to a normal state of operation.

DETAILED DESCRIPTION

Figure 1:
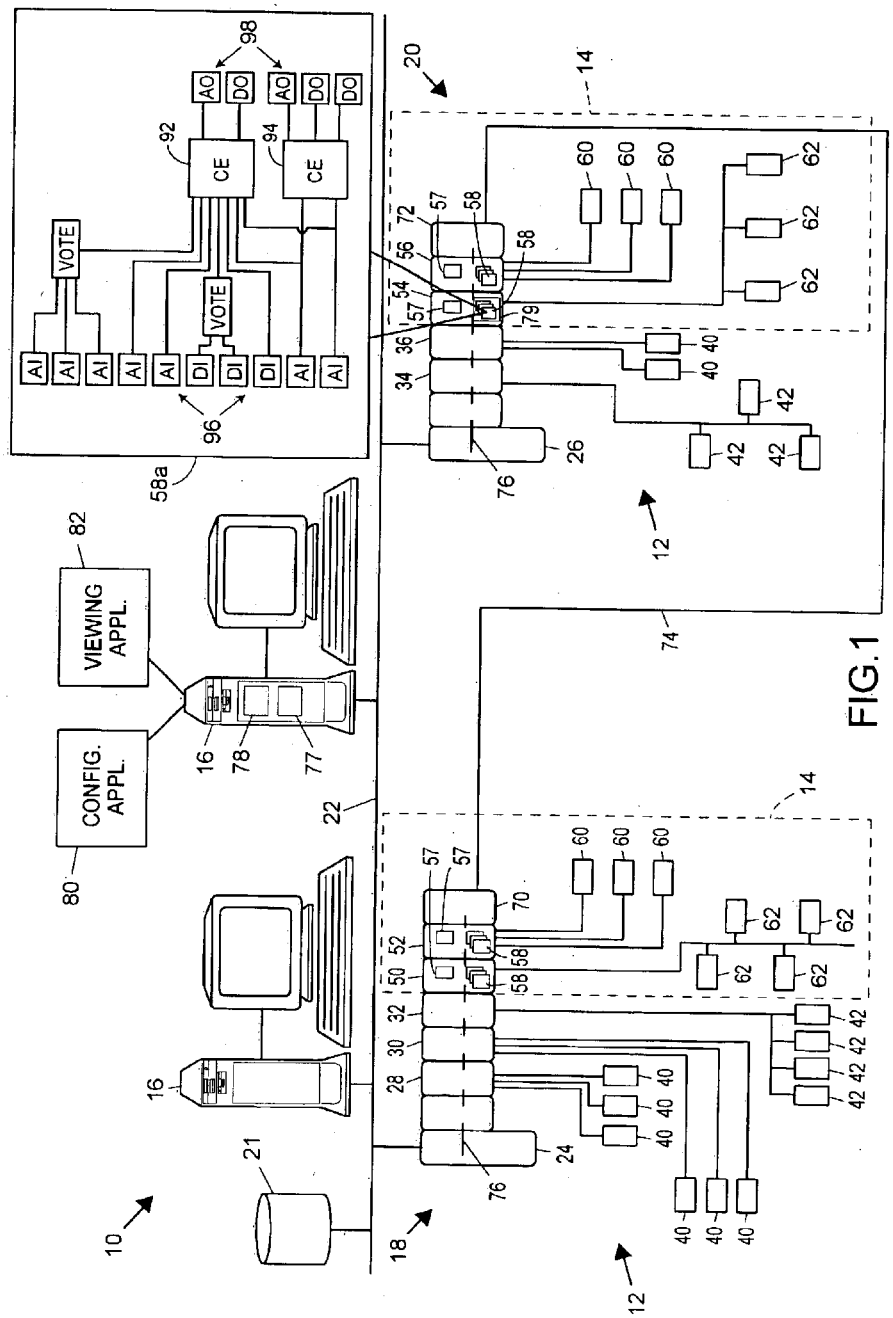
FIG. 1 is a block diagram of an exemplary process plant having a safety system that is integrated with a process control system and that uses one or more cause and effect function blocks to perform control activities with respect to safety equipment within the process plant.

Referring now to FIG. 1, a process plant 10 includes a process control system 12 integrated with a safety system 14 (indicated by dotted lines), which generally operates as a Safety Instrumented System (SIS) to monitor and override the control provided by the process control system 12 to maximize the likely safe operation of the process plant 10. The process plant 10 also includes one or more host workstations, computers or user interfaces 16 (which may be any type of personal computers, workstations, PDAs, etc.) which are accessible by plant personnel, such as process control operators, maintenance personnel, safety engineers, etc. In the example illustrated in FIG. 1, two user interfaces 16 are shown as being connected to two separate process control/safety control nodes 18 and 20 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

Generally speaking, each of the nodes 18 and 20 of the process plant 10 includes both process control system devices and safety system devices connected together via a bus structure that may be provided on a backplane into which the different devices are attached. The node 18 is illustrated in FIG. 1 as including a process controller 24 (which may be a redundant pair of controllers) as well as one or more process control system input/output (I/O) devices 28, 30 and 32 while the node 20 is illustrated as including a process controller 26 (which may be a redundant pair of controllers) as well as one or more process control system I/O devices 34 and 36. Each of the process control system I/O devices 28, 30, 32, 34 and 36 is communicatively connected to a set of process control related field devices, illustrated in FIG. 1 as field devices 40 and 42. The process controllers 24 and 26, the I/O devices 28–36 and the controller field devices 40 and 42 generally make up the process control system 12 of FIG. 1.

Likewise, the node 18 includes one or more safety system logic solvers 50, 52, while the node 20 includes safety system logic solvers 54 and 56. Each of the logic solvers 50–56 is an I/O device having a processor 57 that executes safety logic modules 58 stored in a memory and is communicatively connected to provide control signals to and/or receive signals from safety system field devices 60 and 62. Additionally, each of the nodes 18 and 20 includes at least one message propagation device (MPD) 70 or 72, which are communicatively coupled to each other via a ring type bus connection 74 (only part of which is illustrated in FIG. 1). The safety system logic solvers 50–56, the safety system field devices 60 and 62, the MPDs 70 and 72 and the bus 74 generally make up the safety system 14 of FIG. 1.

The process controllers 24 and 26, which may be, by way of example only, DeltaV™ controllers sold by Fisher-Rosemount Systems, Inc., or any other desired type of process controllers are programmed to provide process control functionality (using what are commonly referred to as control modules) using the I/O devices 28, 30 and 32 (for the controller 24), the I/O devices 34 and 36 (for the controller 26) and the field devices 40 and 42. In particular, each of the controllers 24 and 26 implements or oversees one or more process control routines stored therein or otherwise associated therewith and communicates with the field devices 40 and 42 and the workstations 16 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4–20 ma protocol (as illustrated for the field devices 40), any fieldbus protocol such as the FOUNDATION® Fieldbus protocol (as illustrated for the field devices 42), or the CAN, Profibus, the AS-Interface protocols, to name but a few. Similarly, the I/O devices 28–36 may be any known types of process control I/O devices using any appropriate communication protocol(s).

The safety logic solvers 50–56 of FIG. 1 may be any desired type of safety system control devices that include a processor 57 and a memory that stores safety logic modules 58 adapted to be executed on the processor 57 to provide control functionality associated with the safety system 14 using the field devices 60 and 62. Of course, the safety field devices 60 and 62 may be any desired type of field devices conforming or using any known or desired communication protocol, such as those mentioned above. In particular, the field devices 60 and 62 may be safety-related field devices of the type that are conventionally controlled by a separate, dedicated safety-related control system. In the process plant 10 illustrated in FIG. 1, the safety field devices 60 are depicted as using a dedicated or point-to-point communication protocol, such as the HART or the 4–20 ma protocol, while the safety field devices 62 are illustrated as using a bus communication protocol, such as a Fieldbus protocol. The safety field devices 60 may perform any desired function, such as that of a shut-down valve, a shut-off switch, etc.

A common backplane 76 (indicated by a dashed line through the controllers 24, 26, the I/O devices 28–36, the safety logic solvers 50–56 and the MPDs 70 and 72) is used in each of the nodes 18 and 20 to connect the controllers 24 and 26 to the process control I/O cards 28, 30 and 32 or 34 and 36, as well as to the safety logic solvers 50, 52, 54 or 56 and to the MPDs 70 or 72. The controllers 24 and 26 are also communicatively coupled to, and operate as a bus arbitrator for the bus 22, to enable each of the I/O devices 28–36, the logic solvers 50–56 and the MPDs 70 and 72 to communicate with any of the workstations 16 via the bus 22.

As will be understood, each of the workstations 16 includes a processor 77 and a memory 78 that stores one or more configuration and/or viewing applications adapted to be executed on the processor 78. A configuration application 80 and a viewing application 82 are illustrated in an exploded view in FIG. 1 as being stored in one of the workstations 16. However, if desired, these applications could be stored and executed in different ones of the workstations 16 or in other computers associated with the process plant 10. Generally speaking, the configuration application 80 provides configuration information to a safety engineer and enables the safety engineer to configure some or all elements of the process plant 10 and to store that configuration in the configuration database 21. As part of the configuration activities performed by the configuration application 80, the safety engineer may create control routines or control modules for the process controllers 24 and 26, may create safety logic modules 58 for any and all of the safety logic solvers 50–56 (including creating and programming cause and effect function blocks for use in the safety logic solvers 50–56) and may download these different control and safety modules to the appropriate ones of the process controllers 24 and 26 and the safety logic solvers 50–56 via the bus 22 and controllers 24 and 26. Similarly, the configuration application 80 may be used to create and download other programs and logic to the I/O devices 28–36, any of the field devices 40, 42, 60 and 62, etc.

Conversely, the viewing application 82 may be used to provide one or more displays to a user, such as to a process control operator, a safety operator, etc., which includes information about the state of the process control system 12 and the safety system 14 either in separate views or in the same view, if so desired. For example, the viewing application 82 may be an alarm display application that receives and displays indications of alarms to an operator. If desired, such an alarm viewing application may take the form as disclosed in U.S. Pat. No. 5,768,119 entitled "Process Control System Including Alarm Priority Adjustment" and U.S. patent application Ser. No. 09/707,580 entitled "Integrated Alarm Display in a Process Control Network", both of which are assigned to the assignee of this patent and are hereby expressly incorporated by reference herein. It will be understood, however, that the alarm display or alarm banner of these patents may receive and display alarms from both the process control system 12 and the safety system 14 in an integrated alarm display as the alarms from both systems 12 and 14 will be sent to the operator workstation 14 executing the alarm display application and will be recognizable as alarms from different devices. Likewise, an operator may deal with safety alarms displayed in an alarm banner in the same manner as process control alarms. For example, the operator or user may acknowledge safety alarms, turn off safety alarms, etc. using the alarm display, which will send messages to the appropriate process controller 24, 26 within the safety system 14 using communications over the bus 22 and the backplane 76 to take the corresponding action with respect to the safety alarm. In a similar manner, other viewing applications may display information or data from both the process control system 12 and the safety system 14 as these systems may use the same types and kinds of parameters, security and referencing so that any data from one of the systems 12 and 14 can be integrated into a display or view traditionally provided for a process control system.

In any event, the applications 80 and 82 may send separate configuration and other signals to and may receive data from each process controllers 24 and 26 as well as from each of the safety system logic solvers 50–56. These signals may include process-level messages related to controlling the operational parameters of the process field devices 40 and 42, and may include safety-level messages related to controlling the operational parameters of the safety-related field devices 60 and 62. While the safety logic solvers 50–56 may be programmed to recognize both the process-level messages and the safety-level messages, the safety logic solvers 50–56 are capable of distinguishing between the two types of messages and will not be capable of being programmed or effected by process-level configuration signals. In one example, the programming messages sent to the process control system devices may include certain fields or addresses which are recognized by the safety system devices and which prevent those signals from being used to program the safety system devices.

If desired, the safety logic solvers 50–56 may employ the same or a different hardware or software design as compared to the hardware and software design used for the process control I/O cards 28–36. The use of alternate technologies for the devices within the process control system 12 and devices within the safety system 14 may minimize or eliminate common cause hardware or software failures.

Furthermore, the safety system devices, including the logic solvers 50–56 may employ any desired isolation and security techniques to reduce or eliminate the chances of unauthorized changes being made to the safety-related functions implemented thereby. For example, the safety logic solvers 50–56 and the configuration application 80 may require a person with a particular authority level or a person located at a particular workstation to make changes to the safety modules within the logic solvers 50–56, with this authority level or location being different from the authority or access level or location needed to make changes to the process control functions performed by the controllers 24 and 26 and the I/O devices 28–36. In this case, only those persons designated within the safety software or located at workstations authorized to make changes to the safety system 14 have authorization to alter safety-related functions, which minimizes the chances of corruption to the operation of the safety system 14. As will be understood, to implement such security, the processors within the safety logic solvers 50–56 assess the incoming messages for proper form and security and operate as gatekeepers on changes being made to the safety-level control modules 58 executed within the safety logic solvers 50–56.

Furthermore, if desired, once safety-related functions are enabled within the logic solvers 50–56, no change of status to the safety functions can be made via the operator workstations 14 without proper access rights, which enables the communication structure associated with the process control system 12 to be used to provide initialization for the safety system 14 and to be used to provide run-time reporting of the operation of the safety system 14, but to still isolate the process control system 12 from the safety system 14 in the sense that changes to the process control, system 12 cannot impact the operation of the safety system 14.

As will be understood, the use of the backplane 76 in each of the nodes 18 and 20 enables the safety logic solvers 50 and 52 and the safety logic solvers 54 and 56 to communicate locally with one another to coordinate safety functions implemented by each of these devices, to communicate data to one another, or to perform other integrated functions. On the other hand, the MPDs 70 and 72 operate to enable portions of the safety system 14 that are disposed at vastly different locations of the plant 10 to still communicate with one another to provide coordinated safety operation at different nodes of the process plant 10. In particular, the MPDs 70 and 72 in conjunction with the bus 74 enable the safety logic solvers associated with different nodes 18 and 20 of the process plant 10 to be communicatively cascaded together to allow for the cascading of safety-related functions within the process plant 10 according to an assigned priority. Alternatively, two or more safety-related functions at different locations within the process plant 10 may be interlocked or interconnected without having to run a dedicated line to individual safety field devices within the separate areas or node of the plant 10. In other words, the use of the MPDs 70 and 72 and the bus 74 enables a safety engineer to design and configure a safety system 14 that is distributed in nature throughout the process plant 10 but that has different components thereof communicatively interconnected to enable the disparate safety related hardware to communicate with each other as required. This feature also provides scalability of the safety system 14 in that it enables additional safety logic solvers to be added to the safety system 14 as they are needed or as new process control nodes are added to the process plant 10.

It will be understood that the logic solvers 50–56 may be programmed to perform control activities with respect to the safety devices 60 and 62, using a function block programming paradigm. In particular, as illustrated in a blown up view of one of the safety control modules 58a (stored in a memory 79) of the logic solver 54, a safety control module may include a set of communicatively interconnected function blocks that can be created and downloaded to the logic solver 54 for implementation during operation of the process 10. As illustrated in FIG. 1, the control module 58a includes two cause and effect (CE) function blocks 92 and 94 having inputs (called cause inputs) communicatively interconnected with other function blocks 96, which may be, for example, analog input (AI), digital input (DI) function blocks, voter function blocks or other function blocks designed to provide cause signals to the cause and effect function blocks 92 and 94. The cause and effect function blocks 92 and 94 have outputs (called effect outputs) connected to output function blocks 98 which may be analog output (AO), digital output (DO) or other function blocks which receive effect signals from the cause and effect function blocks 92 and 94 to control the operation of the safety devices 60 and 62, such as switches, valves, etc. Of course, the safety control module 58a may be programmed in any desired manner to include any types of function blocks along with one or more cause and effect function blocks configured in any desired or useful manner to perform any desired functionality.

Also, while the blown up view of the safety control module 58a of FIG. 1 includes two cause and effect function blocks therein, it will be understood that any number of different safety logic modules 58 can be created for and used within each of the different logic solvers 50–56 and each of these modules can include any number of cause and effect function blocks communicatively connected to other function blocks in any desired manner. Likewise, if used in, for example, a Fieldbus network, the cause and effect function blocks 92 and 94, which may be any fieldbus type function blocks, or any of the other function blocks connected thereto could be located and implemented in other devices, such as in the field devices 62. If used outside of a safety system, the cause and effect function blocks could be implemented in the process controllers 24, 26, the I/O devices 28–36, the field devices 42, etc.

Figure 2:
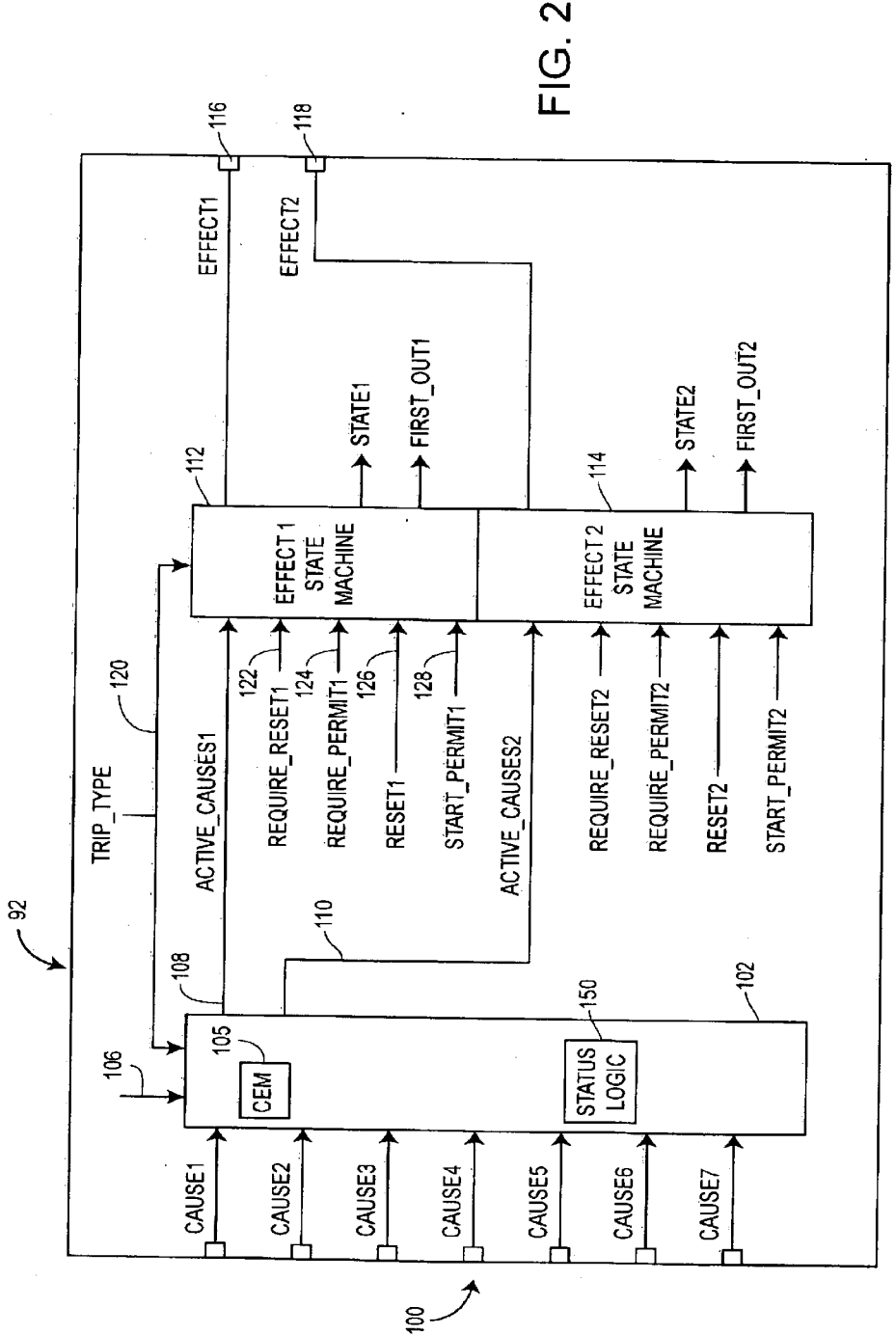
FIG. 2 is block diagram of one of the cause and effect function blocks of FIG. 1.

FIG. 2 is a block diagram illustrating the components of the cause and effect function block 92 of FIG. 1. The cause and effect function block 92 includes, in this case, seven cause inputs 100 each of which is marked as Cause1, Cause2, Cause3, etc. and is adapted to receive a cause signal delivered from a different source, such as one of the input function blocks 96 of FIG. 1. Alternatively, the cause signals could be provided by other applications or other elements within the process besides function blocks. Each of the cause inputs 100 is provided to a matrix logic block, referred to herein as a multiplexer 102, which uses cause and effect matrix (CEM) logic 105, such as a typical cause and effect matrix that may be provided by a safety engineer at an input 106, to determine which effects, if any, should be activated or tripped as a result of any particular cause input changing state to indicate the detection of a specified unsafe condition within the process 10.

Figure 3:
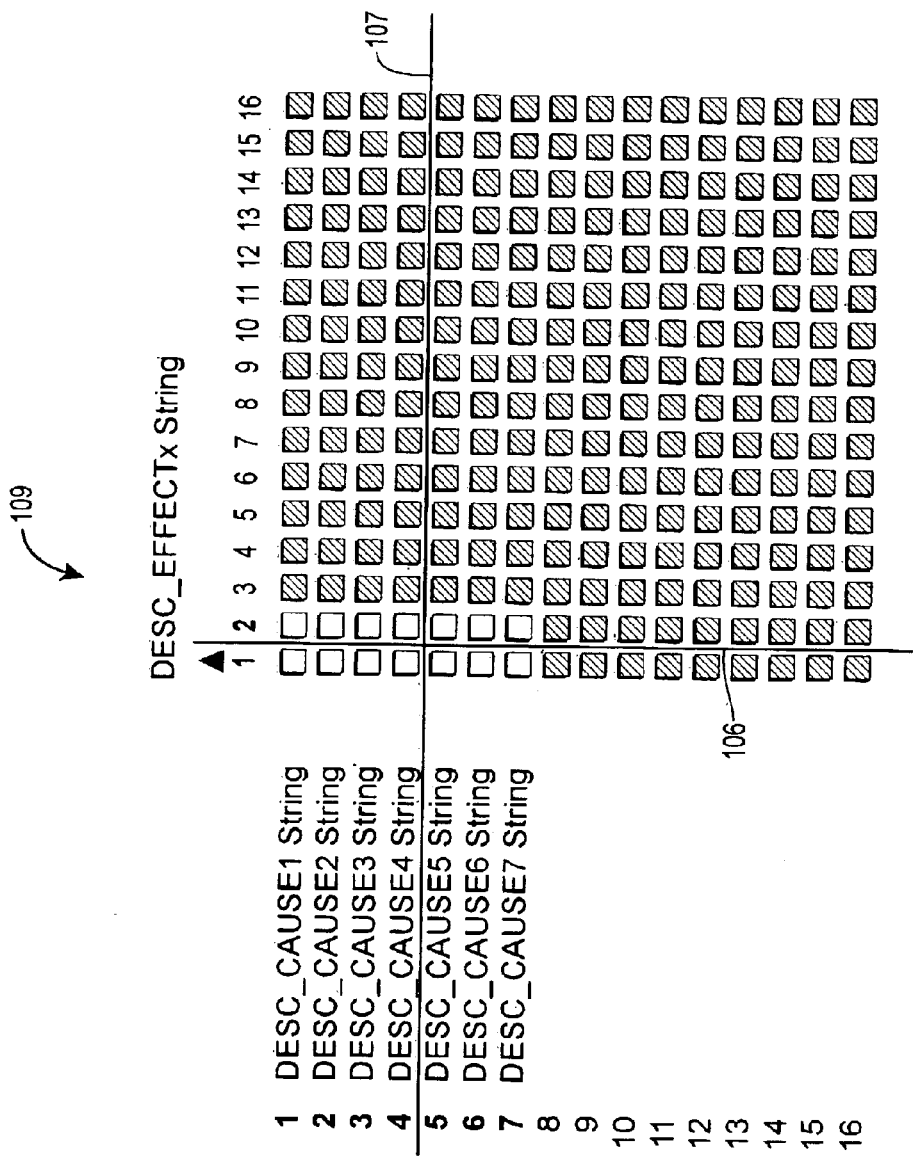
FIG. 3 is a graphical depiction of an example cause and effect matrix.

An example cause and effect matrix 105 showing typical cause and effect logic is illustrated in more detail in FIG. 3. The cause and effect matrix 105, which may be used in the cause and effect function block 92 includes seven causes listed down the left-hand side of the matrix (with each cause associated with a different row of the matrix 105) and has two effects listed along the top of the matrix (with each effect associated with a different column of the matrix 105). The causes are identified as complex data variables or signals named DESC_CAUSE1 String, DESC_CAUSE2 String, etc. each of which may have a value and a status associated therewith and the effects are identified as complex data variables or signals named DESC_EFFECT1 String, DESC_EFFECT2 String, etc. each of which may have a value and a status associated therewith. While the matrix 105 is illustrated as providing possibly up to 16 causes and 16 effects, in this case only seven causes and two effects are being used because that is the manner in which the example cause and effect function block 92 is configured. It will be understood, however, that a cause and effect function block as contemplated herein can have any reasonable number of causes and effects (inputs and outputs) associated therewith and that the cause and effect matrix will generally include the same number of causes and effects as there are cause inputs and effect outputs of the cause and effect function block. Moreover, the matrix 105 could be of any desired size including any size other than 16 by 16 as illustrated in FIG. 3.

The matrix 105 is illustrated in FIG. 3 in the manner in which it may be depicted to, for example, a safety engineer when the safety engineer is configuring or creating the cause and effect function block 92. To enable proper programming of the matrix logic 105, the string that is provided for each cause and effect may uniquely identify or name the cause or effect to assure that safety engineer understands which causes and effects are actually represented in the matrix 105. Likewise, a vertical line 106 and a horizontal line 107 may be used and manipulated by the safety engineer to align the boxes or elements of the matrix 105 to specific causes and effects listed on the left and top sides of the matrix 105. In this manner, the safety engineer may be able to clearly identify which box relates to which cause and effect. Likewise, the boxes or elements of the matrix 105 may be grayed out if they are not to be used.

As will be understood, a check in a particular box of the cause and effect matrix 105 indicates that the cause associated with that box will result in the effect associated with that box, while the absence of a check indicates that the cause will not result in the effect. Thus, the first cause DESC_CAUSE1 will result in both effects, DESC_EFFECT1 and DESC_EFFECT2 being tripped or activated. However, the second cause DESC_CAUSE2 will only result in the first effect DESC_EFFECT1 being tripped. Of course, the safety engineer may select a box using a mouse or a keyboard, by dragging a check over the box and dropping it onto the box, or in any other desired manner. The cause and effect matrix 105, is a property of and is provided to the multiplexer 102 of FIG. 2 prior to operation of the cause and effect function block 92.

Referring again to FIG. 2, upon receiving one or more cause inputs, the multiplexer 102 produces outputs on appropriate ones of trip signal lines 108 and 110 indicating the active causes which are currently present at the input of the multiplexer 102 for each of the two effects, as defined by the cause and effect matrix 105. Each of the trip signal lines 108 and 110 is connected to one of two state machines 112 and 114 within the cause and effect function block 92. The different state machines 112 and 114 are associated with the different effect outputs and produce the different effect signals developed by the cause and effect function block 92. In particular, the state machines 112 and 114 cause effect outputs 116 and 118 (labeled Effect1 and Effect2), respectively, to be tripped or set to the safe or tripped state in response to the presence of a cause indication on the lines 108 and/or 110, respectively. In this example, when using the matrix 105 of FIG. 3, and when the Cause1 and Cause2 inputs 100 concurrently become active at the appropriate cause inputs 100 (while each of the other causes Cause3 through Cause7 remain inactive), the multiplexer 102 will place a signal on the trip signal line 108 including an indication of Cause1 and Cause2 because both of these causes result in the operation or tripping of the Effect1 according to the matrix logic 105 of FIG. 3. Similarly, the multiplexer 102 will place a signal on the trip signal line 110 that indicates only Cause1, which is the only active cause that results in Effect 2 being set or tripped according to the matrix 105 of FIG. 3.

Generally speaking, there is a single and different state machine for each effect or effect output associated with a cause and effect function block. In this case of FIG. 2, because the cause and effect function block 92 includes only two effect outputs, it only includes two state machines 112 and 114. However, if the cause and effect function block 92 were to include more effect outputs, such as ten or twelve effect outputs, the cause and effect function block 92 would include ten or twelve state machines, respectively. Likewise, the multiplexer 102 would be coupled to each of those state machines via, for example, a different trip signal line to provide an active cause string to those state machines based on the conditions of the cause input 100 and on the matrix 105 provided to the multiplexer 102.

The operation of the Effect1 state machine 112 will now be described, it being understood that the other state machines within the cause and effect function block 92 will operate in similar manners. In particular, the state machine 112 for Effect1 receives a Trip_Type input signal on a line 120, an active causes input or signal on the trip signal line 108 (labeled as Active_Causes1), as well as a set of condition inputs including a Require_Reset1 signal 122, a Reset_Permit1 signal 124, a Reset1 signal 126 and a Start_Permit1 128. The trip signal input and the condition inputs cause the state machine 112 to transition between different states as described further herein to cause changing of the Effect1 signal 116 at the output of the cause and effect function block 92 to change between a normal or untripped value and a tripped or safe value and, conversely, between a tripped or safe value and the normal or untripped value.

More particularly, when the Active_Causes1 string on the line 108 indicates that one or more causes (which are supposed to result in the Effect1 signal going into a safe or tripped state) are currently active, the state machine 112 will force the Effect1 output signal 116 to go into the tripped or safe state. The definition of the tripped or safe state may depend on or be defined by a Trip_Type signal on the line 120 provided to the input of the state machine 112. In particular, the Trip_Type signal on the line 120 may define the safe operating state or value of the Effect1 signal as either a one or a zero, a high or a low, etc. At the same time, the Trip_Type signal 120 may define the state or value of the cause signals 100 which, when input to the multiplexer 102, indicate that a cause is or is not present. That is, a cause signal 100 can likewise be defined as either a zero or a one, a low or a high value, etc. to indicate the presence or absence of a detected cause within the process. The Trip_Type signal on the line 120 may define the values of the causes and the effects associated with a detected cause and with a safe effect state for proper operation of the cause and effect function block 92. Generally speaking, each of the cause inputs 100 will define the presence of a cause (e.g., as either a one or a zero) in the same manner and each of the effect output signals 116 and 118 will define an effect (e.g., as either a one or a zero) in the same manner. If this is the case, the same Trip_Type signal on the line 120 may be provided to each state machine in the cause and effect function block 92. If this is not the case, a separate Trip_Type signal may be defined and provided separately to each of the different state machines within the cause and effect function block 92.

In any event, when the Active_Causes1 signal on the line 108 indicates a value or condition associated with the detection of one or more causes within the process, the state machine 112 forces the Effect1 output signal 116 to go to its tripped or safe value. However, once the Effect1 output signal 116 is in the safe state, the state machine 112 may have to operate or travel between a series of additional states in order to force or change the Effect1 output signal 116 back to the normal or untripped value or state. The operation of the state machine 112 is determined in large part by the signals present at the condition inputs Require_Reset1 122, Reset_Permit1 124, Reset1 126 and Start_Permit1 128 of the state machine 112 which, as will be understood, are configurable individually on each different state machine by the safety engineer or other user to specify permissive logic used to transition between the tripped and normal states, or vice versa. Because the condition inputs may vary from state machine to state machine, each effect output of the cause and effect function block 92 may have different transitional behavior associated therewith.

Figure 4:
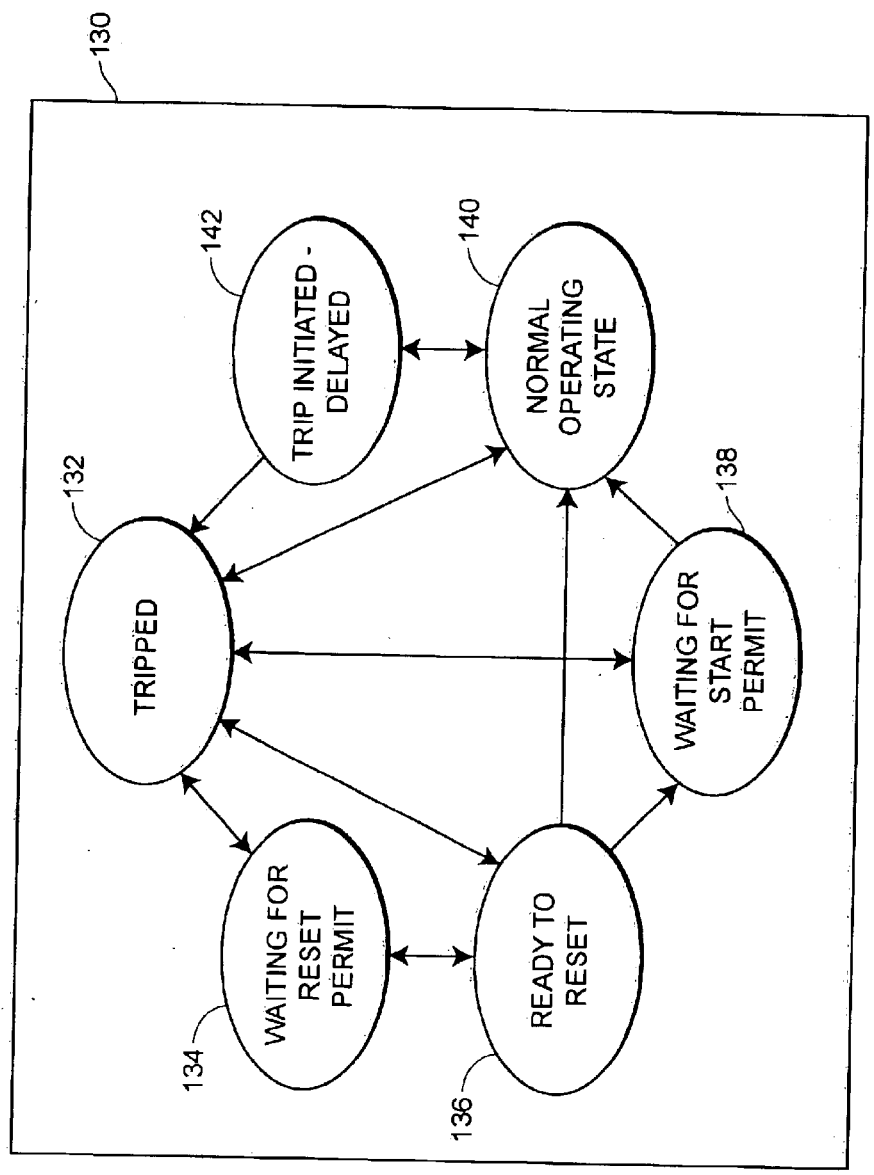
FIG. 4 is a state diagram illustrating a set of states potentially associated with each state machine in the cause and effect function block of FIG. 2.

FIG. 4 depicts a state diagram 130 illustrating different states that the state machine 112 may cycle through to go from a tripped or safe mode to an untripped or normal mode, or vice versa. The state diagram 130 of FIG. 4 includes six states defined as: a tripped state 132, a waiting for reset permit state 134, a ready to reset state 136, a waiting for start permit state 138, a normal operating state 140 and a trip initiated-delayed state 142. The arrows between the states in the state diagram 130 indicate the possible state transitions between the states 132–142.

As will be understood from the state diagram 130, the state machine 112 may enter into the tripped state 132 from any of the states 134, 136, 138, 140 and 142 in which it is currently located in response to the state machine 112 receiving an active cause at the trip signal input 108. Thus, when the state machine 112 is in the normal operating state 140 and the Effect1 signal 116 is in the normal state, the presence of one or more active causes on the trip signal line 108 will cause the state machine 112 to enter into the tripped state 132. Similarly, the presence of an active cause indication on the trip signal line 108 will cause the state machine 112 to enter into the tripped state 132 when the state machine 112 is in any of the other states 134, 136, 138 and 142.

Once in the tripped state 132, the state machine 112 will force the Effect1 signal 116 to the tripped or safe value, as defined by the Trip_Type signal on the line 120. The state machine 112 will stay in the tripped state (thereby keeping the Effect1 output signal 116 at the tripped or safe value) until all of the active cause signals on the line 108 are removed, i.e., until all of the cause signals at the inputs 100 which result in the Effect1 are set to a "no cause present" value. The state machine 112 may enter any of the states 134, 136, 138 and 140 from the tripped state 132 depending upon the signals present at the condition inputs 122, 124, 126 and 128 to the state machine 112. For example, if the Require_Reset1 signal 122 is set high or active and the Reset_Permit1 signal 124 is low or inactive, the state machine 132 must go to the waiting to reset permit state 134 from the tripped state 132 and will not be able to enter directly into any of the other states. Once entering the waiting for reset permit state 134, the state machine 112 checks the value of the Reset_Permit1 signal 124. When this signal goes high or active, thereby indicating a reset permit (which may be, for example, issued by an operator or other personnel in the process control system 10 using the user interface 16 of FIG. 1) has been received by the state machine 112, the state machine 112 enters into the ready to reset state 136. Alternatively, if the Require_Reset1 signal 122 is low (thereby indicating that a reset permit is not required), the state machine 132 may transfer directly from the tripped state 132 to the ready to reset state 136.

At the ready to reset state 136, removal of the Reset_Permit1 signal 124 when the Require_Reset1 signal 122 is active will cause the state machine 112 to go back into the waiting for reset permit state 134. Alternatively, in the ready to reset state 136, the state machine 112 waits for the Reset1 signal 126, which may be generated by a keystroke or command from an operator or by an application, such as a batch executive application, to become present at the condition input 126 to the state machine 112. When the Reset1 signal 126 is received, the state machine 112 enters into the normal operating state 140, if a Start_Permit1 signal 128 is present or active at the input to the state machine 112 or enters into the waiting for start permit state 138 if the Start_Permit1 signal is not present or active at the condition input 128 of the state machine 112. Alternatively, the state machine 112 may enter directly from the tripped state 132 into the waiting for start permit state 138 when a reset permit is not required or is required and is present (i.e., when the Require_Reset1 signal 122 is inactive or is active and the Reset_Permit1 signal 124 is present or active) and when the Reset1 signal 126 is present or active.

When in the waiting for start permit state 138, the state machine 112 waits until a the Start_Permit1 signal becomes high or active at the condition input 128 and then enters into the normal operating state 140. The Start_Permit1 signal may be generated by an operator via, for example, one of the user interfaces 16 of FIG. 1, by an application in a controller or any other computer within the process control network 10, by a process variable or other process signal or in any other desired manner. However, a start permit signal is typically generated by the operator or by other software within a program such as batch software application to instruct the cause and effect function block to start the cycle of operating in the normal mode.

The state machine 12 may enter into the normal operating state 140 directly from the tripped state 132 when a reset permit is not required or is required and is present (i.e., when the Require_Reset1 signal 122 is inactive or is active and the Reset_Permit1 signal 124 is present or active) and both the Reset1 signal 126 and the Start_Permit1 signal 128 are present or active. In any event, once in the normal operating state 140, the state machine 112 forces the Effect1 signal 116 to its normal or untripped state, as defined by the Trip_Type signal 120 and thereby allows normal operation of the process with respect to the Effect1 being controlled by the state machine 112.

As will be understood, the permissive logic of the state machine 112 may be accomplished or defined by manipulation of internal parameters that can be exposed as condition inputs to the cause and effect function block 92. A safety engineer may decide for each effect signal what condition signals are required before the effect signal will transition to the normal operating state. For example, in the state diagram of FIG. 4, if an operator reset is required, a reset permit, the operator reset itself, and a start permit are necessary to transition to the normal operating state. If an operator reset is not required, only the start permit needs to be present after all associated causes signals have become inactive.

The state machine 112 can go immediately into the tripped state 132 from the normal operating state 140 upon receiving one or more active causes on the trip signal line 108 of FIG. 2. However, if desired, the state machine 112 can also be set up to enter into the trip initiated-delayed state 142 from the normal operating state 140 when the state machine 112 receives one or more active causes on the trip signal line 108. A separate input may be provided to each of the state machines 112 and 114 to indicate whether these state machines should use the trip-initiated-delayed state 142, or the state machines 112 and 114 can be configured at creation to use or not use the trip initiated-delayed state. When in the trip initiated-delayed state 142, the state machine 112 sets a clock or other counter and counts down (or up) to a predetermined value to thereby wait a specific time period before entering the tripped state 132. After the time period has timed out, the state machine 112 enters into the tripped state 132. During the trip initiated-delayed state 142, however, the state machine 112 will keep the Effect1 output signal 116 of FIG. 2 in the normal or untripped state. If desired, the state machine 112 may be designed to be able to re-enter the normal operating state 140 if all of the cause indications on the trip signal line 108 are removed before the timer counts out or if an abort signal (such as one issued by an operator) is received by the state machine 112 before the timer counts out. Alternatively, the state machine 112 may be designed to only be able to exit the trip initiated-delayed state 142 into the tripped state 132. The trip initiated-delayed state 142 may be used to prevent noise or minor fluctuations in the cause signals 100 from causing a shut-down (which can be very expensive in terms of lost time, man-hours and materials) or to enable an operator or other user an opportunity to abort a shut-down.

While the state machine diagram 130 of FIG. 4 illustrates one manner of enabling the state machines of the cause and effect function block 92 to transition between a normal operating state and a tripped state, and vice versa, it will be understood that the state machines could be designed to use fewer of these states or additional states or some combination of the two. Furthermore, the operation of the state machines 112 and 114 enable the cause and effect function block 92 to provide additional functionality over that normally provided in a known cause and effect logic created in other programming environments.

If desired, the state machine 112 can produce a number of other outputs so as to provide information to, for example, an operator or other user or for use by other applications or control routines within the process 10. For example, the state machine 112 may produce a State1 output 140 that provides a string or other signal identifying the state (such as one of the states 132–142 of FIG. 4) in which the state machine 112 is currently located. Still further, the state machine 112 may produce a First_Out1 signal 142 indicating the first cause of the cause inputs 100 which caused the state machine 112 to enter into the tripped state 132. The First_Out1 signal 142 can be used after a process plant or portion thereof has shut down to determine which cause was the first cause present at the input of the state machine 112 to cause the state machine 112 to enter into the tripped state 132 (of FIG. 4). This signal, which is generally reset when the state machine enters into the normal operating mode, is helpful or, in some cases, may be necessary because the placing of the Effect1 output 116 into the tripped state may result in other cause signals 100 becoming active or set high, which may result in the same or even different effect outputs being tripped. At that time, without the first cause output, it is difficult to tell what cause initiated the shut down sequence.

While the multiplexer 102 of the cause and effect function block 92 can operate or detect causes based on the value of the cause signals, the multiplexer 102 may additionally or instead use the status signal associated with one or more of the cause signals 100 to determine if a cause is present. In this case, the multiplexer 102 of FIG. 2 may include a status logic block 150 to determine how and when to generate trip signals on the lines 108 and 110 based on the cause inputs and the cause and effect matrix 105. For example, in one mode of operation, as described above, the status logic block 150 may cause the multiplexer 102 to produce a cause indication on one or more of the trip signal lines 108 and 110 when the value of the proper cause signals indicates the presence of a cause within the plant 10, no matter what the status of the cause signals. In another mode of operation, the status logic block 150 of the multiplexer 102 may cause a tripping of each effect state machine for a particular cause as defined by the cause and effect matrix 105, either if the value of the cause signal indicates the presence of a detected condition and the status of the cause signal is good or normal, or if the status of the cause signal is bad, even if the value of the cause signal remains in a good or "cause not present" condition. In still another mode of operation, the status logic block 150 of the multiplexer 102 may use the last actual cause signal (for a particular cause input 100) which had a good or normal status and ignore all the subsequent cause signals which have a bad status. In this case, if a cause signal goes into a bad status, the multiplexer 102 will simply use the last value associated with that cause signal having a good or normal status (thereby essentially ignoring the bad cause signal). Of course, the status logic block 150 of the multiplexer 102 could use other combinations of the value and status indications or other parameters for each cause signal to detect the presence or absence of a cause within the process plant 10.

While only the operation of the state machine 112 has been described herein, it will be understood that each of the other state machines, such as the state machine 114 of the cause and effect function block 92, operates in a similar manner as described with respect to the state machine 112. Likewise, any number of different state machines may be provided in any particular cause and effect function block with the number being determined by the number of effects generated or controlled by the cause and effect function block.

If desired, the cause and effect function block 92 may include other parameters and status features. For example, the cause and effect function block 92 may include a force effect parameter which can be set by a user, another application, etc. to force one or more of the effect signals into the tripped or safe state. Such a parameter may be used to cause a shut down procedure or to keep the system in a shut down state. The operation of the force effect parameter may cause an immediate shut down procedure, as defined by the effect being forced to the tripped state, even if the state machine associated with the effect being forced to the tripped state is in the trip initiated-delayed state 142 of FIG. 4. Likewise, a force normal parameter, which can be the same or a different parameter as the force effect parameter, may force an effect to a normal state or value, regardless of the cause signals present at the input of the cause and effect function block.

Each effect signal or output of the cause and effect function block may have a status associated therewith determined by, for example, the state in which the state machine associated with the effect signal is located or the status of the cause signals associated with effect signal (as defined by the matrix logic used in the multiplexer 102). In particular, if the status logic 150 of the multiplexer 102 ignores the status of the cause signals or detects a presence of a cause when the status of a cause signal is bad, the status of the effect signal may be set to good unless the status of each of the cause signals associated with the effect signal (as defined by the matrix logic 105) is bad, in which case the status of the effect signal is set to bad. The status of the effect signal may be set to good when the status logic 150 uses the last good value of the cause signals, i.e., ignores the cause signals with bad status. Of course, other status conditions could be defined for each effect signal.

A cause mask parameter may be provided to the cause and effect function block to prevent one or more causes signals from becoming active under certain conditions. For example, a batch executive program may set the cause mask parameter for one or more cause signals being input to the cause and effect function block when a batch is not running, thereby preventing tripping of the effects when no problem can be expected to exist.

An override parameter may be used or output by the cause and effect function block to specify when the normal logic of the cause and effect function block is not being used. This may occur, for example, when the cause mask parameter is set, when the force normal or force effect parameters are set, etc. This parameter may be used in, for example, a user interface to provide status or alarm information to a user, such as to an operator. Of course, the cause and effect function block may provide any desired alarming signals, such as alarms indicating bad status, a forced effect or a forced normal condition, a tripped state on one or more of the effects, etc. As will be understood, any other desired alarms can be used as well or in addition to those described herein.

As can be seen, the use of the cause and effect function block as described herein makes it easy to create a function block having a known format and thus, once created, needs only to be programmed with an appropriate matrix and parameter settings to provide proper operation. Implementation of the cause and effect function block within a function block programming environment is easy, because the cause and effect function block can be created and communicatively connected to other function blocks in any known or desired manner. Likewise, debugging of the cause and effect function block also becomes easier than cause and effect matrix logic created in other programming languages because the cause and effect function block typically only needs to be debugged within the context of how it is connected within the programming environment and the configuration parameters that are sent to it. Still further, documentation of the cause and effect function block is easy because it is a typical function block having standard documentation changed only by the individual parameter and matrix settings provided thereto.

While FIG. 1, indicates that the cause and effect function blocks 92 and 94 receive inputs from AI, DI, Voter or other function blocks, the cause inputs may come from any other types of function blocks or may be generated as other signals within the process plant 10. Still further, while the effect outputs of the cause and effect function blocks 92 and 94 have been illustrated as being connected to output function blocks such as AO, DO or other output function blocks, these outputs can be connected to any other desired type of function blocks, such as sequencer function blocks, staging function blocks, etc., or even directly to other applications or programming environments within the process plant 10. Likewise, while the logic described herein has been effected using a function block programming paradigm, the same logic can be provided in other types of programming environments and still be considered as a function block as used herein. Still further, while the cause and effect function blocks described herein are described for use in a safety system of a process plant or process control environment, these or similar function blocks could be used in a standard process control environment or for other desired uses other than use in a safety system.

Also, while the cause and effect function blocks are described herein as including state machines, it will be understood that these state machines can be implemented in any form such as via hardware or software written in any programming language. To be such a state machine, an element, such as a software program, routine, object, etc. need only cause the function block to transition between states as explained or defined herein or as represented by the outputs of function block to thereby cause the transition of the effect outputs from a safe or tripped state to a normal or non-tripped state or vice-versa.

When implemented, any of the elements described herein, including the multiplexer, blocks, state machines, signal connections, etc. may be implemented in software stored in any computer readable memory such as on a magnetic disk, a laser or optical disk, or other storage medium, in a RAM or ROM of a computer or processor, etc. Signals and signal lines described herein can take any form, including actual wires, data registers, memory locations, etc. This software may take any form, including application software executed on a general purpose computer or processor or hard coded software burned into, for example, an application specific integrated circuit (ASIC), an EPROM, EEPROM, or any other firmware device. Likewise, this software may be delivered to a user, a process plant, an operator workstation, a controller, a logic solver or any other computing device using any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software via a transportable storage medium). Furthermore, this software may be provided directly without modulation or encryption or may be modulated and/or encrypted using any suitable modulation carrier wave and/or encryption technique before being transmitted over a communication channel.

Of course, the cause and effect function blocks described herein can be implemented using any external process control communication protocol (besides a Fieldbus protocol or a DeltaV protocol) and may be used to communicate with any type of function block including any function block that is similar to or the same as any of the different function blocks specifically identified by and supported by the Fieldbus protocol. Moreover, while the cause and effect function blocks in one embodiment hereof are described as Fieldbus "function blocks," it is noted that the use of the expression "function block" herein is not limited to what the Fieldbus protocol identifies as a function block but, instead, includes any other type of block, program, hardware, firmware, etc., entity associated with any type of control system and/or communication protocol that can be used to implement some process control routine functionality or that has a predefined setup or protocol for providing information or data to other such function blocks. Thus, while function blocks typically take the form of objects within an object oriented programming environment, this need not be case and can, instead, be other logical units used to perform particular control (including input and output) functions within a process plant or control environment using any desired programming structure or paradigm.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A function block entity for use in a process plant having a processor adapted to control one or more field devices, the function block entity comprising:

a computer readable medium; and a function block stored on the computer readable medium and adapted to be executed on the processor, the function block including;

a set of cause inputs adapted to receive cause signals from within the process plant each of the cause signals indicating a presence or an absence of a detected cause condition;

one or more effect outputs adapted to provide an effect signal to produce an effect within the process plant;

cause and effect matrix logic relating each of the cause inputs to the effect outputs;

a multiplexer coupled to each of the cause inputs that uses the cause and effect matrix logic to generate one or more trip signals; and one or more state machines, each state machine being coupled to a different one of the trip signals and being coupled to a different one of the effect outputs, wherein each state machine is adapted to force an associated effect output to a tripped value in response to an associated one of the trip signals.

2. The function block entity of claim 1, wherein one of the state machines includes one or more condition inputs and is adapted to force the associated effect output to the tripped value when in a first state, to force the associated effect output to a normal value when in a second state and to cycle through one or more additional states when going from the first state to the second state based on signals at the one or more condition inputs.

3. The function block entity of claim 2, wherein one of the condition inputs is a reset permit condition input specifying a permission to reset the associated effect output and wherein one of the one or more additional states is a reset state in which the one of the state machines waits for a reset permit signal at the reset permit condition input.

4. The function block entity of claim 3, wherein a second one of the condition inputs is a require permit condition input specifying whether a reset permit signal is needed to reset the associated effect signal.

5. The function block entity of claim 3, wherein a second one of the condition inputs is a reset signal input indicating that the one of the state machines should reset the associated effect output and wherein a second one of the one or more additional states is an additional reset state in which the one of the state machines waits for a reset signal at the reset signal input.

6. The function block entity of claim 5, wherein a third one of the condition inputs is a start permit input indicating that the one of the state machines should enter into the second state in which the associated effect output is forced to the normal value and wherein a third one of the one or more additional states is a start state in which the one of the state machines waits for a start permit signal at the start permit input.

7. The function block entity of claim 2, wherein one of the condition inputs is a reset signal input indicating that the one of the state machines should reset the associated effect output and wherein one of the one or more additional states is a reset state in which the one of the state machines waits for a reset signal at the one of the reset signal input.

8. The function block entity of claim 2, wherein one of the condition inputs is a start permit input indicating that the one of the state machines should enter into the second state in which the associated effect output is forced to the normal value and wherein one of the one or more additional states is a start state in which the one of the state machines waits for a start permit signal at the start permit input.

9. The function block entity of claim 2, wherein the one of the state machines is adapted to enter into a further state when going from the second state to the first state, wherein the further state causes the one of the state machines to wait for a predetermined period of time before entering into the first state.

10. The function block entity of claim 9, wherein the one of the state machines includes a clock to determine the predetermined period of time when the one of the state machines is in the further state.

11. The function block entity of claim 2, wherein the one of the state machines produces a further output indicating a particular state in which the one of the state machines is located.

12. The function block entity of claim 1, wherein one of the state machines is adapted to force the associated effect output to the tripped value when in a first state, to force the associated effect output to a normal value when in a second state and is adapted to cycle through a third state when going from the second state to the first state, wherein the third state causes the one of the state machines to wait for a predetermined period of time before entering into the first state.

13. The function block entity of claim 12, wherein the one of the state machines includes a clock to determine the predetermined period of time when the one of the state machines is in the third state.

14. The function block entity of claim 1, wherein the multiplexer is adapted to use a value of the cause inputs along with the cause and effect matrix logic to generate the one or more trip signals.

15. The function block entity of claim 1, wherein one of the cause signals includes a value and a status and wherein the multiplexer includes status logic adapted to use the status and the value of the one of the cause signals along with the cause and effect matrix logic to generate the one or more trip signals.

16. The function block entity of claim 15, wherein the status logic of the multiplexer generates one of the one or more trip signals according to the cause and effect matrix logic when the status of the one of the cause signals is bad.

17. The function block entity of claim 16, wherein the status logic further generates the one of the one or more trip signals according to the cause and effect matrix logic when the status of the one of the cause signals is good and when the value of the one of the cause signals indicates the presence of a condition.

18. The function block entity of claim 15, wherein the status logic of the multiplexer generates one of the one or more trip signals according to the cause and effect matrix logic using the last value of the one of the cause signals for which the status was good.

19. The function block entity of claim 1, further including a trip type indication that defines a value of one of the cause signals associated with the presence of a cause and wherein the multiplexer uses the trip type indication to detect the presence of a cause based on the value of the one of the cause signals.

20. The function block entity of claim 1, further including a trip type indication that defines a value of one of the effect outputs associated with the tripped value and wherein one of the state machines uses the trip type indication to set the associated effect output to the tripped value.

21. The function block entity of claim 1, wherein one of the state machines produces a further output indicating a first cause input which resulted in the one of the state machines forcing the associated effect output to the tripped value.

22. A control system for use in a process plant having a plurality of field devices connected within a process, the control system comprising:

a control device communicatively coupled to the plurality of field devices, the control device including a processor and a computer readable medium; and a control block stored on the computer readable medium and adapted to be executed on the processor, the control block including;

a set of cause inputs adapted to receive cause signals from within the process plant each of the cause signals indicating a presence or an absence of a detected cause condition;

one or more effect outputs adapted to provide an effect signal to produce an effect within the process plant using one of the plurality of field devices;

cause and effect matrix logic relating each of the cause inputs to the effect outputs;

a multiplexer coupled to each of the cause inputs that uses the cause and effect matrix logic to generate one or more trip signals; and one or more state machines, each state machine being coupled to a different one of the trip signals and being coupled to a different one of the effect outputs, wherein each state machine is adapted to force an associated effect output to a tripped value in response to an associated one of the trip signals.

23. The control system of claim 22, wherein the control block is a function block.

24. The control system of claim 22, wherein the control block is a function block conforming to a fieldbus protocol.

25. The control system of claim 22, wherein one of the state machines includes one or more condition inputs and is adapted to force the associated effect output to the tripped value when in a first state, to force the associated effect output to a normal value when in a second state and to cycle through one or more additional states when going from the first state to the second state based on signals at the one or more condition inputs.

26. The control system of claim 25, wherein one of the condition inputs is a reset permit condition input specifying a permission to reset the associated effect output and wherein one of the one or more additional states is a reset state in which the one of the state machines waits for a reset permit signal at the reset permit condition input.

27. The control system of claim 25, wherein one of the condition inputs is a reset signal input indicating that the one of the state machines should reset the associated effect output and wherein one of the one or more additional states is a reset state in which the one of the state machines waits for a reset signal at the reset signal input.

28. The control system of claim 25, wherein one of the condition inputs is a start permit input indicating that the one of the state machines should enter into the second state in which the associated effect output is forced to the normal value and wherein one of the one or more additional states is a start state in which the one of the state machines waits for a start permit signal at the one of the start permit input.

29. The control system of claim 25, wherein the one of the state machines is adapted to enter into a further state when going from the second state to the first state, wherein the further state causes the one of the state machines to wait for a predetermined period of time before entering into the first state.

30. The control system of claim 25, wherein the one of the state machines produces a further output indicating a particular state in which the one of the state machines is located.

31. The control system of claim 22, wherein one of the cause signals includes a value and a status and wherein the multiplexer includes status logic adapted to use the status and the value of the one of the cause signals along with the cause and effect matrix logic to generate the one or more trip signals.

32. The control system of claim 31, wherein the status logic of the multiplexer generates one of the one or more trip signals according to the cause and effect matrix logic when the status of the one of the cause signals is bad.

33. The control system of claim 31, wherein the status logic of the multiplexer generates one of the one or more trip signals according to the cause and effect matrix logic using the last value of the one of the cause signals for which the status was good.

34. The control system of claim 22, wherein one of the state machines produces a further output indicating a first cause input which resulted in the one of the state machines forcing the associated effect output to the tripped value.

35. The control system of claim 22, wherein the control block is a first function block and further including additional function blocks communicatively connected to the first function block via the cause inputs or the effect outputs.

36. A method of forcing one or more effect signals used within a process plant to control field devices between a normal value and a tripped value, comprising:

receiving a set of cause signals from within the process plant, each of the cause signals indicating a presence or an absence of a detected cause condition;

storing cause and effect matrix logic relating each of the cause signals to the one or more effect signals;

using the cause and effect matrix logic to create a set of trip signals based on the cause signals;

delivering each of the trip signals to a separate state machine, wherein each state machine is associated with a different one of the effect signals; and using the state machines to generate the effect signals to be in the normal value or in the tripped value in response to the trip signals.

37. The method of claim 36, wherein using the state machines includes forcing one of the effect signals to the tripped value when one of the state machines is in a first state based on one of the trip signals, forcing the one of the effect signals to a normal value when the one of the state machines is in a second state based on the one of the trip signals and further including providing one or more condition signals to the one of the state machines and cycling the one of the state machines through one or more additional states when going from the first state to the second state based on values of the one or more condition signals.

38. The method of claim 37, wherein providing one or more condition signals includes providing a reset permit signal specifying a permission to reset the one of the effect signals and wherein cycling the one of the state machines through the one or more additional states includes causing the one of the state machines to enter a reset state in which the one of the state machines waits for the reset permit signal.

39. The method of claim 37, wherein providing one or more condition signals includes providing a reset signal specifying a command to reset the one of the effect signals and wherein cycling the one of the state machines through the one or more additional states includes causing the one of the state machines to enter a reset state in which the one of the state machines waits for the reset signal.

40. The method of claim 37, wherein providing one or more condition signals includes providing a start permit signal specifying a permission to start the process effected by the one of the effect signals and wherein cycling the one of the state machines through the one or more additional states includes causing the one of the state machines to enter a start state in which the one of the state machines waits for the start permit signal.

41. The method of claim 37, further including producing an output signal indicating a particular state in which the one of the state machines is located.

42. The method of claim 36, wherein using the state machines includes forcing one of the effect signals to the tripped value when one of the state machines is in a first state based on one of the trip signals, forcing the one of the effect signals to the normal value when the one of the state machines is in a second state based on the one of the trip signals and further including causing the one of the state machines to cycle through a third state when going from the second state to the first state, wherein the third state causes the one of the state machines to wait for a predetermined period of time before entering into the first state.

43. The method of claim 36, wherein using the cause and effect matrix logic to create the set of trip signals based on the cause signals includes using a value of one of the cause signals along with the cause and effect matrix logic to generate the trip signals.

44. The method of claim 36, wherein receiving the set of cause signals from within the process plant includes receiving a value and a status associated with at least one of the cause signals and wherein using the cause and effect matrix logic to create the set of trip signals based on the cause signals includes using the value and the status of the at least one of the cause signals along with the cause and effect matrix logic to generate the trip signals.

45. The method of claim 44, wherein using the value and the status of the at least one of the cause signals along with the cause and effect matrix logic to generate the trip signals includes generating one or more of the trip signals according to the cause and effect matrix logic when the status of the at least one of the cause signals is bad.

46. The method of claim 44, wherein using the value and the status of the at least one of the cause signals along with the cause and effect matrix logic to generate the trip signals includes generating one or more of the trip signals according to the cause and effect matrix logic using the last value of the at least one of the cause signals for which the status was good.

47. The method of claim 36, further including providing a further output indicating a first cause signal which resulted in one of the state machines forcing one of the effect signals to the tripped value.

* * * * *

UNITED STATES PATENT AND TRADEMARK OFFICE
CERTIFICATE OF CORRECTION

PATENT NO. : 6,898,468 B2
DATED : May 24, 2005
INVENTOR(S) : Michael G. Ott et al.

It is certified that error appears in the above-identified patent and that said Letters Patent is hereby corrected as shown below:

Column 7,
Line 18, please delete "control," and insert -- control --.

Column 9,
Line 11, please insert -- the -- immediately before "safety".

Column 12,
Line 16, please delete "a the" and insert -- the --.

Column 14,
Line 51, please insert -- the -- immediately before "effect".

Column 15,
Line 25, please delete "easy," and insert -- easy --.

Signed and Sealed this

Sixth Day of September, 2005

JON W. DUDAS
*Director of the United States Patent and Trademark Office*